United States Patent [19]

Sholl

[11] 3,769,037
[45] Oct. 30, 1973

[54] METHOD OF FOAM INJECTING FLAVOR OR TEXTURE IMPROVING SUBSTANCES INTO MEAT

[75] Inventor: Jeffrey J. Sholl, Minneapolis, Minn.

[73] Assignee: The Pillsbury Company, Minneapolis, Minn.

[22] Filed: Aug. 18, 1971

[21] Appl. No.: 172,700

[52] U.S. Cl.............. 426/281, 426/382, 426/319, 426/320
[51] Int. Cl............................................ A22c 18/00
[58] Field of Search................... 99/107, 159, 254, 99/255, 256, 257, 107, 159, 532, 533, 534, 535, 536

[56] References Cited
UNITED STATES PATENTS

| | | | |
|---|---|---|---|
| 3,216,826 | 11/1965 | Wattenbarger | 99/107 |
| 3,436,230 | 4/1969 | Harper et al. | 99/107 X |
| 3,675,567 | 7/1972 | Rejsa et al. | 99/107 X |

Primary Examiner—Hyman Lord
Attorney—Ronald E. Lund et al.

[57] ABSTRACT

An improved composition to be used in the injection of meat products. The composition donsists of a stabilized foam including moisture, a foam stabilizer and an active meat flavor or texture modifier.

2 Claims, 3 Drawing Figures

PATENTED OCT 30 1973
3,769,037
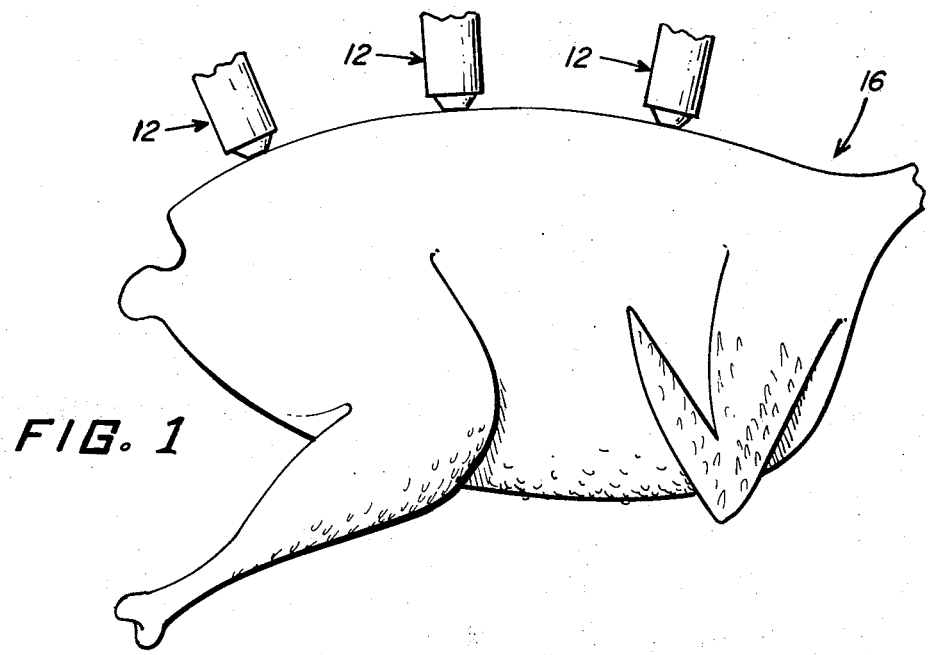
FIG. 1
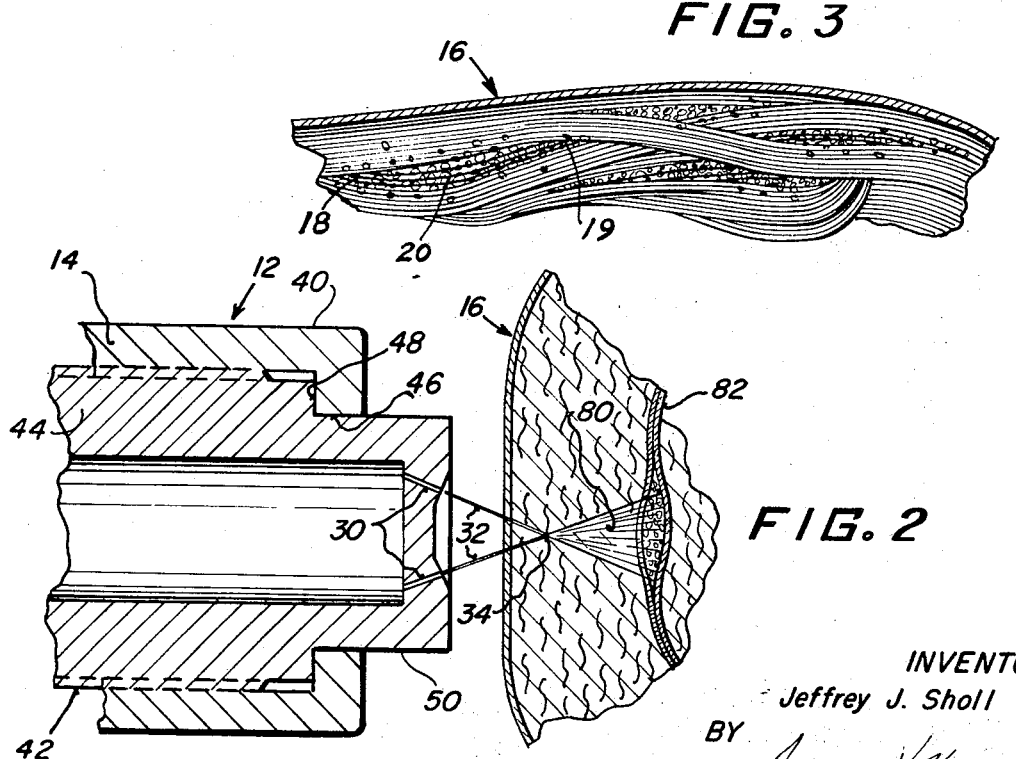
FIG. 3
FIG. 2
INVENTOR
Jeffrey J. Sholl
BY
[signature]
ATTORNEY

METHOD OF FOAM INJECTING FLAVOR OR TEXTURE IMPROVING SUBSTANCES INTO MEAT

FIELD OF THE INVENTION

The present invention relates to meat processing and more particularly to an injectable fluid to be used in improving meat products.

THE PRIOR ART

Many compositions have been previously proposed for introduction into meat products to improve the flavor, texture or shelf life of the meat. The most common of these are salts, including phosphate salts, enzymes, butter, seasoning materials, pickling solutions, etc. An important objective in preparing such a composition is to provide a composition which will carry the active ingredients throughout the meat while adding as little water as possible. It is important to avoid adding excessive amounts of water since much of its seeps out uring storage and because in some cases applicable government regulations may be violated. A further important objective in the injection of meat products is to provide good distribution of the injected material throughout the tissue. Thus, it has been noted in the course of the development of the present invention that when large amounts of liquid are injected, they tend to accumulate in pockets or cells and are not readily distributed. A further important problem in obtaining satisfactory injection of a variety of meat products is the requirement for retaining the injected materials within the tissue during the normal storage period. In prior approaches the stability of the injected material during storage has not always been satisfactory nor has distribution of the injected material been outstanding.

OBJECTS OF THE INVENTION

The primary objects are the provision of an improved injection process and composition which a) requires less moisture and thereby reduces the amount of water introduced into the tissue being injected, b) provides a very high degree of stability after being injected and c) becomes distributed better throughout the tissue.

THE FIGURES

FIG. 1 is a side elevational view of a chicken being injected in accordance with the invention.

FIG. 2 is a partial vertical sectional view taken through one of the injection nozzles and adjacent tissue as fluid is injected and FIG. 3 is a section of tissue showing the distribution of the injected material therethrough.

SUMMARY OF THE INVENTION

Briefly, the invention provides an improved aqueous solution or suspension suited for injection into meat products such as poultry and the like consisting of a stabilized foam composed of moisture, enclosed gas cells, a foam stabilizer and an active flavor or texture modifier.

DETAILED DESCRIPTION OF THE INVENTION

The present invention provides an improved method and composition for reducing the amount of moisture used in injection solutions. An important aspect of the invention is the provision of a stable foam structure which functions as a vehicle for the active ingredients being injected. The foam is stabilized by any food compatible foaming agent which in the quantities used will not interfere with the quality of the food product. Any of a variety of gases such as nitrogen, carbon dioxide, fluorocarbons and the like can be used. The preferred gases are those which are chemically nonreactive under the conditions of use. Oxygen or air is not one of the preferred gases because of its chemical activity. The gases used make up about 10 to 90 percent and preferably between 20 and 50 percent by volume of the expanded foam at atmospheric pressure.

Moisture is present in the amount of about 10 to 90 percent and preferably between about 20 and 70 percent. The balance comprises active ingredients either dissolved or suspended therein. Among the active ingredients preferred are seasoning such as salt and pepper, smoke and other spices; tenderizing agents such as enzymes (proteolytic, lypolytic or both); other tenderizing agents such as phosphate salts and coloring agents.

Among the various emulsifiers or foam stabilizing that can be used are any of the well-known stearate esters and particularly the monostearate esters.

One preferred foaming agent comprises a mixture of propylene glycol monoester and glycerol monoester. Monoglycerides are lipids which differ from ordinary fats (which contain three fatty acid radicals with one glycerol radical) in that monoglycerides have only one fatty radical per molecule. Other materials can be used with the emulsifier such as the soluble cellulose derivatives including carboxymethylcellulose, methylcellulose, polysaccharides and mixtures thereof as well as other fatty acid esters and mixed mono- and diglycerides Emulsifying agents which can be used in the present invention are surface active substances that possess both lypophilic and hydrophilic properties. Interfacial tension of an oil and water mix is reduced by these agents and an emulsion is stabilized. Accordingly, oil, if present, will remain mixed with the water for a longer period of time without separating.

Among the monostearate ester emulsifiers which are preferred in conjunction with the invention are the spray dried mixes described in U.S. Pat. No. 3,434,848 Example V(a). The preferred monostearate esters are composed of glycerol monostearate and propylene glycol monostearate as mentioned above. Monoglycerides make up about 41 percent, propylene glycol monoester about 58 percent and the total of monoglycerides and propylene monoesters makes up about 42 percent of the composition. The remainder is an inert substance. To make the spray dried product, water is mixed with sugar in the amount of about 20 percent, fat in the amount of about 20 percent, and the esters in the amount of about 42.0 percent. This moist product is then spray dried.

If desired, gum arabic and corn syrup solids or both can also be used in the composition. One emulsifier product which can be used consists of a spray dried mixture of 40 percent gum arabic, 20 percent sucrose, 20 percent corn syrup solids and 20 percent monostearate esters as described above. This spray dried product is cold water soluble which aids in the production of an aerated food structure and moreover there is no necessity for fat to be present. Another suitable pre-mix is described in U.S. Pat. No. 3,582,357, which is incorporated herein by reference.

As mentioned briefly above, the gas employed is preferably used in the amount of about 10 percent by volume to about 90 percent by volume of composition at atmospheric pressure but typically between about 20 to 50 percent of the expanded volume at atmospheric pressure.

The gas is preferably added with vigorous mixing. The mixed material can be stored at elevated pressure e.g. 50–200 p.s.i. Just before injection, pressure is increased to 1,000–10,000 p.s.i. or more (typically 1,200–2,600 p.s.i.) at which pressure it is injected. After penetrating the tissue its volume increases by at least about 20–25 percent.

Refer now to the figures and particularly in FIG. 2 is shown one form of a spraying apparatus 12 for injecting foam.

The fluid to be injected is pumped under pressure into nozzle 14 where it is expelled through a plurality of bored jet openings 30 as a plurality of streams 32 which converge when the machine is being used at a focal point 34 located externally of the nozzle.

As best seen in FIG. 2, the nozzle 12 comprises a cap 40 provided with screw threads 42 adapted to be threaded onto a nozzle mounting pipe 44. The cap 40 is provided with a reduced bore 46 defining a shoulder 48 that engages and securely holds a nozzle insert 50 preferably formed of a wear-resistant material such as tungsten-finishing steel. The insert 50 is provided in this case with three openings 30 all of which are appropriately aligned relative to one another to direct streams 32 to the focal point 34. The distance of the focal point from the exposed surface of the nozzle can be varied greatly between say one-sixteenth inch and an inch or more. The focal point can be located at the surface or beneath the surface of the piece being injected, but not in the air space between the nozzle and the piece since the streams are disruped by contact with one another and lose a substantial amount of their penetrating power. I prefer to have the jets 32 converge at a distance of around one-quarter inch from the exposed surface of the nozzle when the invention is applied in injecting fluids into poultry. The size of the nozzle openings 30 for most purposes should be between about 0.005 and 0.050 inches in diameter.

The openings 30 can be formed in any suitable manner but I prefer to form them by a process known as spark discharge drilling. Using this process, holes 30 can easily be drilled with a diameter of 0.014 inches or smaller.

The pumping pressure will, of course, depend upon the application for which the nozzle is designed. In injecting liquids into poultry products, it is preferred to operate at pressures between about 1,000 and 10,000 p.s.i. or more, 1,500 p.s.i. being typical.

The jet can be started or stopped either manually (in the event a nozzle 12 of the type described above is used) or automatically. Where the jet is automatically pulsed, good results were achieved operating at 1,500 p.s.i. with one-tenth second valve-open pulses at intervals of 3 seconds through a three-hole nozzle of a one-quarter inch focal length with bored openings of 0.014 inches in diameter.

In operation, the nozzle 12 is then placed at the proper distance, e.g., one-eighth inch from the surface of the piece 16 being injected. The valve is then opened for the desired period of time allowing the converging jets 32 to strike the surface of the piece being injected.

At a pressure of between 1,000 and 2,000 p.s.i., the liquid jets 32 in which the gas appears not to be expanded will easily puncture the skin, penetrate beneath the surface and converge at point 34. The disrupting effect caused by the jets striking one another at the focal point 34 was found to break up the streams into a rather random fan-shaped spray 80 that has much less penetrating power than the original jets 32. While the spray 80 may penetrate a short distance, it is easily stopped by discontinuities in the tissue such as a connective tissue 82 surrounding a muscle bundle.

The invention will be better understood by reference to the following examples. All amounts herein unless otherwise stated are given in percent by weight.

EXAMPLE Ia

An injectable solution is made up having the following formulation:

TABLE I

| | | |
|---|---|---|
| Water | 86.4 | |
| Salt | 5.4 | |
| Soluble Pepper | 5.2 | 75% |
| Garlic Powder | 1.0 | By Weight |
| Smoke Flavor | 0.8 | |
| Enzyme Solution | 5.0 | |
| Monosodium Glutamate | 1.2 | |

The above ingredients are then added to a mixture of:

TABLE II

| | | |
|---|---|---|
| Monostearate Esters | 25% | 25% |
| Hydrolyzed Cereal Solids | 10% | By Weight |

The solution is mixed until uniform and packed in cans pressurized with $N_2$ at a pressure of 2,000 p.s.i. with about equal parts gas to injectible liquid by volume at atmospheric pressure. The solution is then adjusted to a pH of about 4.0. The remaining examples set forth herein below are similarly adjusted. The solution is injected into steak and will produce a juicy peppery flavorful steak.

EXAMPLE II

Another injection solution is prepared having the following formula:

TABLE III

| | |
|---|---|
| Smoke Flavor | 0.02% |
| Spray Dried Stearate Ester Pre-Mix (dry material) | 20% |
| Water | 75% |
| Salt | 4% |
| Soluble Pepper | 0.98% |

The above pre-mix consists of:

TABLE IV

| | Parts by Weight |
|---|---|
| Hydrolyzed Cereal Solids (Mor-rex) | 10 |
| Water | 5 |
| Sugar | 20 |
| Fat | 20 |
| Monostearate Ester | 100 |

This composition is mixed, packed in metal cylinders and pressurized with nitrogen at a pressure of 2,600 p.s.i. to provide about 50 parts by volume of nitrogen for each 100 parts of solution at atmospheric pressure. When the solution is injected into beef and poultry in the amount of about 2 percent by weight a pleasing smoky taste is achieved. The minute bubbles present in the foam structure remain stable for about 8 hours while the injected material tends to distribute itself throughout the tissue.

EXAMPLE III

A solution is made up having the following formulation:

| | |
|---|---|
| Black pepper flavor | 1.00 |
| Onion powder | 1.50 |
| Garlic powder | 0.50 |
| Citric acid | 3.00 |
| Red pepper flavor | 5.00 |
| Raisin flavor | 0.0125 |
| Ginger flavor | 0.12 |
| Apple flavor | 0.02 |
| Mustard flavor | 0.25 |
| Allspice flavor | 0.065 |
| Cassia flavor | 0.075 |
| Cloves flavor | 0.0525 |

This formula is added at a 30 percent by weight level to a 1 percent acetic acid solution. This solution is blended into the premix of Table II in the same proportion as in Example I. The resulting solution is used for injection.

The solution is mixed with $CO_2$ gas in the amount of 25 percent by volume and pressurized in steel cylinders to a pressure of 2,500 p.s.i. The solution is injected through a needle into meat products at a level of about 1-½ to 2 percent by weight. When injected into steak, it gives the steak a tangy and spicy character.

EXAMPLE IV

The use of the invention as a marinade is illustrated by the following formulation:

| | |
|---|---|
| Water | 89.53% |
| Sodium Chloride | 5.3% |
| PO₄ | 3.1% |
| Monosodium Glutamate | 1.2% |
| Soluble Pepper | 0.15% |
| Soluble Celery | 0.22% |
| Carboxymethylcellulose | 0.5% |

The formulation and solution is mixed until uniform and placed in suitable containers pressured with Freon gas at a pressure of about 14 p.s.i. An expanded foam product results when the foam is released. The gas content of the foam is about 90 percent. The formulation is injected into meat products at the level of about 2 percent by weight and results in a very mild flavor and juicy appearance.

In cooking meat products treated with the above solutions, it was noticed that surface browning was the only apparent color change due to the foam injection. The surface browning is slight and only enhances the natural browning reaction. This is due in part to the sugar content of the injected foams and of the lower pH of the injected solutions, which were adjusted to a pH of about 4.0 for increased microbial protection.

It was noted that dispersion of the injected foam is rapid and widespread with the major portion of the material migrating through the muscle sheath, that is to say, horizontally as seen in FIG. 3 e.g. toward points 18 and 19 from an initial injection point 20. In poultry parts e.g. breasts, legs and wings, one injection point is all that is necessary for complete dispersion throughout an entire part. When the foam solution is injected into poultry parts, the pieces become enlarged due to the expansion of the foam which makes them appear more appealing. Flavor distribution in steak or other beef products is also exceptional with flavor migration and foam migration occuring along the muscle fibers and connective tissue sheaths.

A further advantage of the invention is the reduction in the amount of liquid used for injecting a given quantity of active ingredients (flavor and tenderizers, etc.) Thus, for example, while it was found previously that it was necessary to use about two parts water for each one parts of active ingredients that with the use of the present invention, this could be reduced to about one parts water for each 10 parts of active flavoring or tenderizing ingredient.

A further advantage of the invention is in the limited splattering that occurs during injection due to the viscosity characteristics of the foam. While in a normal injection either using a needle or a high pressure stream one finds a noticeable amount of injected fluid oozing out of the injection openings after injection but these difficulties are eliminated with the present invention. Moreover, the splattering and dispersal of injection fluids from missed shots is to a large extent eliminated in foam injection due to the viscosity of the foam which keeps it from splattering. Thus, many of the benefits of foam injection lie in the ability of the foam to act as a large surface, large volume, low density transmission medium for introducing flavors, tenderizers, nutrients, preservatives, and the like. The reduction in amounts of water used is desirable both from the standpoint of weepage and because of the reduction of microbial activity as well as the possibility of reaching applicable government standards in water content. Thus, for example, it was found that 1-2 percent by weight foam injection provided the same flavor and textural distribution benefits as 8-16 percent by weight of injected 80 percent aqueous solution which contained no dissolved gas.

What is claimed is:

1. A method of foam injecting flavor or texture improving substances into meat tissue products comprising the steps of preparing a foam mixture comprising water, texture or flavor modifying constituents and a food compatible gas selected from the group consisting of nitrogen, carbon dioxide and flurocarbon, a foam stabilizer in sufficient amount to maintain the foam solution stable, placing the mixture under pressure of 1,000 p.s.i. to 10,000 p.s.i. to compress the gas cells in said mixture, foam injecting the mixture while under said pressure into the meat and allowing said mixture to expand in the meat tissue to distribute the constituents therethrough.

2. The method of claim 1 wherein said mixture comprises a stabilized foam composed of between about 10 and 90 percent moisture and about 10 to 90 percent of a food compatible gas by volume of the composition at atmospheric pressure, said gas being non-reactive under the conditions of use and being pressurized to a pressure of at least 1,200 p.s.i. prior to injection and the foam stabilizer comprising an effective amount of a steareate ester.

* * * * *